United States Patent
Joco et al.

(10) Patent No.: US 8,177,475 B2
(45) Date of Patent: May 15, 2012

(54) CONTAMINANT-DEFLECTOR LABYRINTH SEAL AND METHOD OF OPERATION

(75) Inventors: Fidel Manalo Joco, La Palma, CA (US); Marshall Saville, Torrance, CA (US); Alan Kang, Torrance, CA (US)

(73) Assignee: Honeywell International, Inc., Morristown, NJ (US)

( * ) Notice: Subject to any disclaimer, the term of this patent is extended or adjusted under 35 U.S.C. 154(b) by 1048 days.

(21) Appl. No.: 12/114,554

(22) Filed: May 2, 2008

(65) Prior Publication Data
US 2009/0274548 A1    Nov. 5, 2009

(51) Int. Cl.
*F04D 27/02*    (2006.01)
(52) U.S. Cl. .......... 415/1; 415/113; 415/174.5; 415/230
(58) Field of Classification Search .................. 415/111, 415/113, 174.5, 230, 1
See application file for complete search history.

(56) References Cited

U.S. PATENT DOCUMENTS

| | | | |
|---|---|---|---|
| 3,053,590 A * | 9/1962 | Dison, Jr. ...................... 384/480 |
| 4,769,051 A | 9/1988 | Defrancesco |
| 4,786,238 A * | 11/1988 | Glaser et al. ..................... 417/53 |
| 5,014,518 A | 5/1991 | Thomson |
| 5,085,443 A | 2/1992 | Richards |
| 5,113,670 A * | 5/1992 | McAuliffe et al. ............. 62/402 |
| 5,133,194 A | 7/1992 | Army, Jr. |
| 5,142,762 A | 9/1992 | Dziorny |
| 5,224,842 A * | 7/1993 | Dziorny et al. ................ 417/406 |
| 5,310,311 A | 5/1994 | Andres |
| 5,921,683 A | 7/1999 | Merritt |
| 6,290,234 B1 * | 9/2001 | Eberle et al. ................... 277/411 |
| 6,427,471 B1 | 8/2002 | Ando |
| 6,695,576 B2 * | 2/2004 | Rosso et al. ................... 415/113 |
| 6,976,679 B2 * | 12/2005 | Goss et al. ..................... 277/347 |
| 7,574,867 B2 * | 8/2009 | Teets et al. ....................... 60/792 |
| 2005/0285348 A1 * | 12/2005 | Prinz .............................. 277/423 |
| 2006/0059942 A1 | 3/2006 | McAuliffe |

* cited by examiner

*Primary Examiner* — Edward Look
*Assistant Examiner* — Andrew C Knopp
(74) *Attorney, Agent, or Firm* — Shimokaji & Assoc., PC (57) ABSTRACT

A seal assembly for deflecting contaminated fluid flowing through the seal assembly from an upstream space to a downstream space includes an annular housing, at least one vent hole peripherally disposed on the annular housing, a first set of seals disposed within the annular housing adjacent to the downstream space, the first set of seals having an inclined surface to deflect the flow of contaminated fluid through the at least one vent hole, and a second set of seals mounted on the shaft, disposed within the annular housing, adjacent to the first set of seals and adjacent to the upstream space. The second set of seals may have larger inside diameter than the first set of seals. The seal assembly may prevent contaminated fluid from entering an air bearing cooling circuit, thereby preventing bearing wear, erosion and failure.

13 Claims, 7 Drawing Sheets

CONTAMINANT-DEFLECTOR LABYRINTH SEAL AND METHOD OF OPERATION

GOVERNMENT RIGHTS

This invention was made with Government support under the N00019-96-C-0054 contract awarded by the US Navy. The Government has certain rights in this invention.

BACKGROUND OF THE INVENTION

The present invention relates generally to contaminant-blocking or deflecting labyrinth seals and, more particularly, to labyrinth seals that separate two spaces containing fluids at different pressures, such as, for example, a seal placed between a shaft and compression chamber housing of a gas turbine or of an aviation turbojet.

Environmental control systems for aircraft typically employ air cycle machines and heat exchangers to cool and condition high-pressure air supplied by either the engines or an auxiliary power unit. In these systems, a compressed air supply air is further compressed in a compressor, cooled in a heat exchanger, and expanded in a turbine. The turbine outlet air, cooled by expansion, flows into the aircraft. Since the aircraft air is maintained at a lower pressure than the supply air, properly designed systems provide conditioned air at temperatures low enough to cool both the cabin and the aircraft avionics.

In such systems, it is continuously a problem to seal an opening through which a rotatable shaft protrudes. The problem is manifested in the difficulty of preventing leakage or loss of pressure or loss of vacuum while at the same time avoiding undue shaft friction. The shaft friction can generate heat, cause loss of power, and damage the machinery.

In aviation turbojets, a seal is required to separate an upstream space, which contains air at the exhaust pressure of the last compression stage of the turbojet (e.g., 20 bar) from a downstream space which connects to the first mobile turbine blading at a lower pressure (e.g., 10 bar). Such seals are also required in space vehicle applications, in underwater vehicle applications, and in applications of ground-based turbo-machinery.

A labyrinth seal is a type of mechanical seal that is not fluid-tight but limits leakage by means of a tortuous path, and is often used to separate two spaces containing fluid at different pressures and, in particular, to seal an opening between a rotatable shaft and a journal bearing.

Air cycle machines that operate in dusty environments prematurely fail due to sand or dust entering the air bearing cooling circuit causing bearing wear, erosion and failure. At startup, an air cycle machine is not yet fully pressurized, and when a labyrinth seal that has one inner diameter is used to seal the opening through which a rotatable shaft protrudes, contaminated air flowing through the labyrinth seal flows directly into the adjacent journal bearings. Furthermore, sand and dust particles deposited between the bearings and the shaft abrade the bearings when the shaft starts to move against the stationary bearings.

Figure 1:
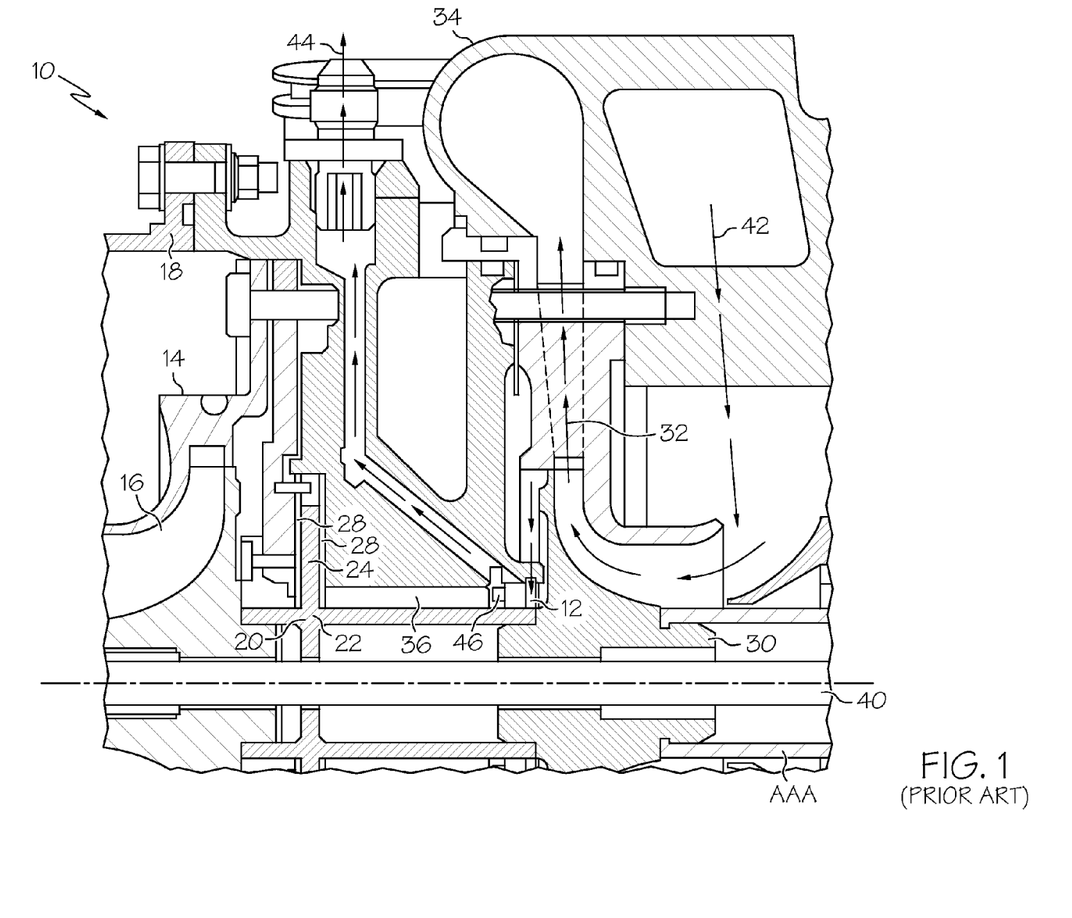
FIG. 1 is a cross sectional partial view of a prior art air cycle machine having a prior art seal assembly, showing air flow during operation at startup.

FIG. 1 shows a cross-sectional partial view of an air cycle machine 10, including a prior art seal assembly 12 having only one inner diameter.

The air cycle machine 10 comprises a compressor housing 180 that admits bleed air flow from the engine (not shown). The bleed air under normal engine pressure enters the compressor inlet 186 (see FIG. 2), passes between the blades of initially stationary compressor wheel 30 that is mounted between 2 colinear shafts 20 and AAA. The engine bleed air exits the compressor wheel 30, passes through the compressor diffuser 32 into the compressor housing scroll 34, and exits into the system duct (not shown) enroute to a heat exchanger (not shown) for pre-cooling. The pre-cooled bleed air enters the turbine housing 18 that houses the turbine nozzle 14 that ejects the bleed air through the nozzle holes to drive the initially stationary turbine wheel 16 that is mounted on the same shaft 20 that mounts the compressor wheel. The air cycle machine 10 may have a thrust disk 24 mounted behind the turbine wheel 16, wherein the thrust disk 24 has a plurality of thrust bearings 28 on each side of the thrust disk 24.

A compressor wheel 30 mounted on the shaft 20 may expel compressed air into a compressor diffuser 32 opening up into an annular shaped compressor housing scroll 34 having a plurality of journal bearings 36. The plurality of journal bearings 36 foils around the shaft 20. The compressor wheel 30 may be connected to the turbine wheel 16 by the shaft 20, which may rotate about the air cycle machine centerline 40. A prior art seal assembly 12 may be disposed between the compressor wheel 30 and the journal bearing 36.

FIG. 1 further shows an exemplary air flow through the air cycle machine 10 from operation at startup when the static air pressure may be about 1 bar throughout the air cycle machine 10 as air pressures are increasing during acceleration from operation at startup to operation at rated speed.

The compressor inlet air flow 42 (indicated by multiple dashed arrows) leaks through the prior art seal assembly 12 to vented outflow 44 via the compressor flow leakage 46 (indicated by dashed arrows), so that contaminants present in the compressor inlet air flow 42 are deposited in the plurality of journal bearings 36 and the plurality of thrust bearings 28.

U.S. Pat. No. 4,320,903 to Ayache et al. discloses a labyrinth seal mounted between a shaft and the housing of a gas combustion chamber. The labyrinth seal comprises a wheel mounted on the shaft and equipped at its periphery with a series of fins, which operate in conjunction with a sealing surface made of a honeycomb material designed to be worn down by the friction of the fins acting thereon. A portion of the air taken from the housing flows through radial canals into holes comprising an overflow valve. When the turbojet is operating at full load, the overflow valve is closed, so that all the air taken in cools the seal. During a deceleration, the valve opens as the velocity decreases until it is fully open at the slow speed, thus opening to the air in the canals a more permeable passage than the one through the sealing surface. At low velocity, the totality of the air, instead of forcing its way through the sealing surface, escapes into the atmosphere through the overflow valve.

U.S. Pat. No. 5,085,443 to Richards et al. discloses an air cycle machine including a labyrinth seal having one inner diameter. When the air cycle machine starts, contaminated air that leaks through the labyrinth seal may deposit contaminants in the adjacent journal bearings.

As can be seen, there is a need for a labyrinth seal that blocks and deflects contaminated fluid so that contaminants do not flow directly into adjacent regions during startup.

SUMMARY OF THE INVENTION

In one aspect of the invention, a seal assembly for filtering a contaminant from a contaminated fluid flowing through the seal assembly from an upstream space to a downstream space, said seal assembly mounted on a shaft, comprises an annular housing, at least one seal assembly vent hole peripherally disposed on the annular housing, a first set of seals mounted on the shaft, disposed within the annular housing and disposed adjacent to the downstream space, the first set of seals having an inclined surface to deflect the flow of contaminated fluid through at least one vent hole; and a second set of seals mounted on the shaft, disposed within the annular housing, disposed adjacent to the first set of seals, and disposed adjacent to the upstream space, wherein the second set of seals has larger inside diameter than the first set of seals to offset the flow of the contaminated fluid and deflecting it into the at least one vent hole.

In another aspect of the invention, a method of preventing contamination between an upstream space and a downstream space containing fluids at different pressures comprises allowing a portion of the fluid flowing in the upstream space to flow through the seal assembly as stated above; venting the contaminated fluid flowing through the seal assembly via the at least one vent hole to prevent the contaminated fluid from reaching the contamination-sensitive components downstream.

In a further aspect of the invention, an air cycle machine includes the seal assembly recited above.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims. Like reference numerals refer to like elements in the drawings.

Embodiments of the present invention can be used to separate a fluid in a higher pressure higher temperature upstream space from a fluid in a lower pressure lower temperature downstream space. In particular, the invention may be used as a filtering labyrinth seal assembly for a refrigeration pack in an aviation turbojet, where the fluid in the upstream space and downstream space are both air; for an underwater vehicle, where the fluid in the upstream space and the fluid in the downstream space are both water; and for a ground based compressor in which the fluid in the upstream space and downstream space are both air.

An exemplary embodiment of the present invention differs from the prior art in that such an embodiment of the present invention may use a plurality of seals of differing diameters, an inclined seal face to deflect contaminated fluid, and a plurality of seal assembly vent holes to vent contaminants during startup before the contaminants can be deposited in an adjacent region. In another exemplary embodiment, a flange on the seal assembly mates with a flat surface on the seal housing to ensure that the seal assembly is rigidly secured.

Figure 2:
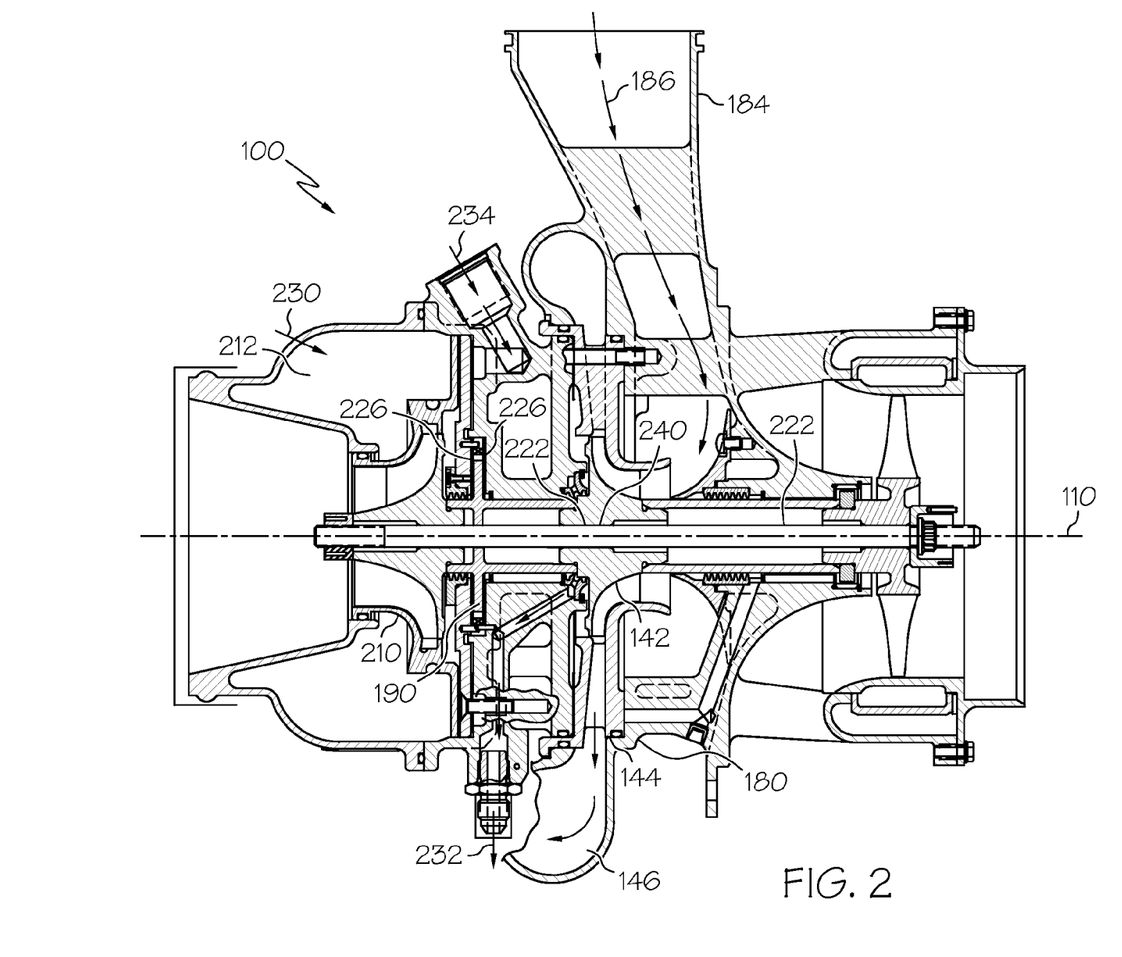
FIG. 2 is a cross sectional partial view of an air cycle machine having a labyrinth seal assembly that blocks the progression of contaminated fluid inside the unit according to an exemplary embodiment of the present invention showing air flow during operation at rated speed.

Referring to FIG. 2, there is shown a cross-sectional partial view of an air cycle machine 100 including a seal assembly 240 having a plurality of inner diameters, as described in more detail below, according an exemplary embodiment of the present invention. When the air cycle machine 100 is operating at rated speed, the static air pressure may be in the order of 4 bar within the turbine housing 212 (an upstream space) and 1 bar within the turbine wheel 16 cavity (a downstream space).

FIG. 2 shows a turbine housing 212, a turbine wheel 210 disposed within the turbine housing 212, a shaft 190 rotating about an air cycle machine centerline 110, a compressor wheel 142 mounted on the shaft 190, a compressor diffuser 144, and a compressor scroll 146, disposed within the compressor housing 180.

A compressor inlet air flow 186 may flow from a compressor inlet 184 through the seal assembly 240 to a vented outflow 232 via a compressor flow leakage (indicated by arrows) so that contaminants present in the leaked compressor air flow 186 are preferentially vented through at least one seal assembly vent hole 262 (see FIG. 3), rather than deposited in a plurality of adjacent journal bearings 222, a plurality of thrust bearings 226, or both.

A portion of pre-cooled turbine inlet flow 230 is diverted for bearing cooling 234 that is also preferentially vented through the at least one seal assembly vent hole 262 according to the vented outflow 232 (indicated by arrows), to facilitate continuous flow of bearing cooling air.

Figure 3:
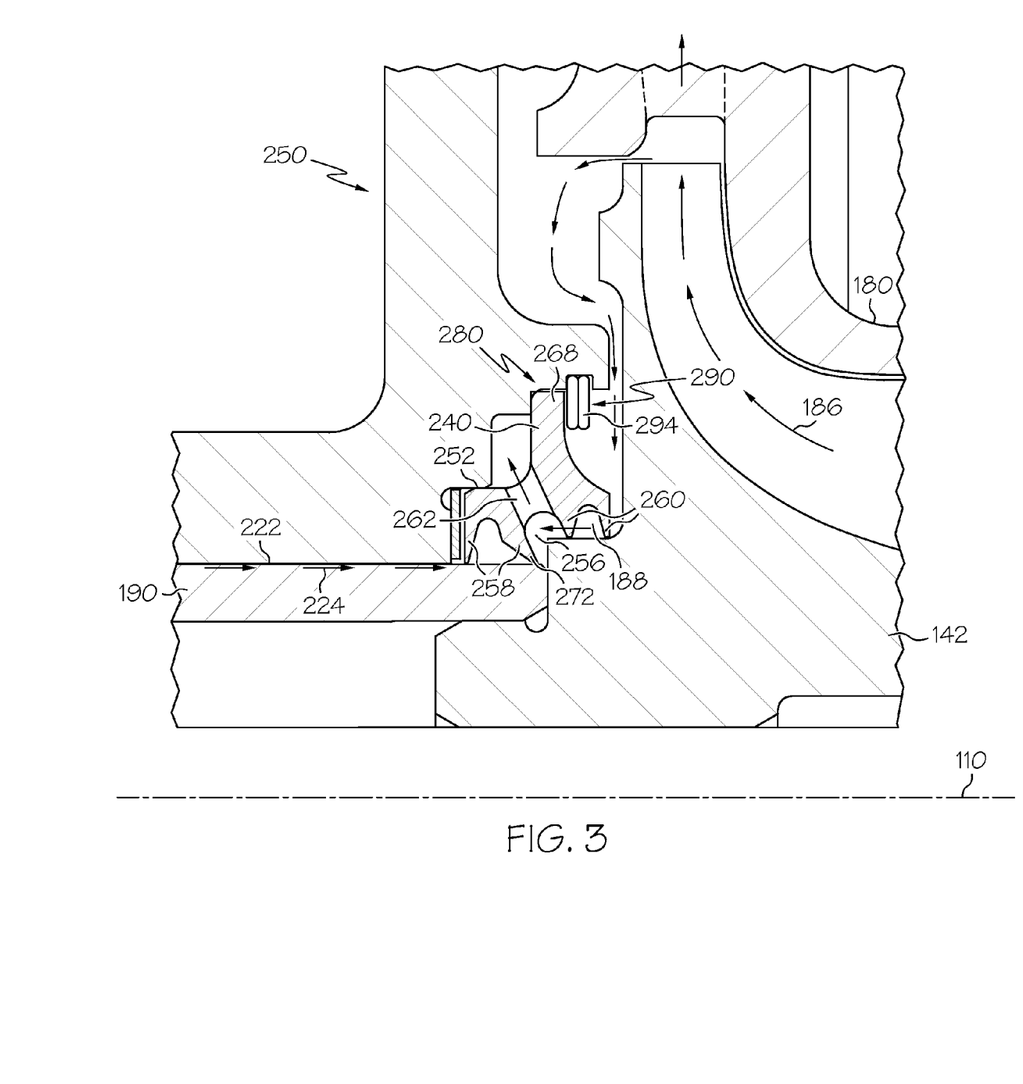
FIG. 3 is a cross sectional partial view of an air cycle machine including a contaminant-deflector labyrinth seal according to an exemplary embodiment of the present invention.

FIG. 3 is a cross sectional partial view of an air cycle machine including a contaminant-deflector labyrinth seal assembly according to an exemplary embodiment of the present invention. FIG. 3 depicts a contaminant-deflector labyrinth seal assembly 240 which may be mounted on a shaft 190 adjacent to a compressor wheel 142. The shaft 190 may rotate about an air cycle machine centerline 110. A plurality of journal bearings 222 may be disposed between the bearing housing 250 and the shaft 190. The contaminant-deflector labyrinth seal assembly 240 may include a purge annulus 256.

A compressor inlet flow 186 and a journal bearing cooling flow 224 may cool the plurality of journal bearings 222, and may leak through the seal assembly 240 according to a compressor flow leakage 188 (indicated by arrows).

A first set of seals 258 may be disposed adjacent to the plurality of journal bearings 222 and may have an inclined deflector face 272 to deflect the flow of contaminated fluid that had leaked from behind the compressor wheel 142 to the at least one seal assembly vent hole 262 peripherally disposed on the purge annulus 256 connected to at least one bearing housing vent hole 254 (see FIG. 4), having sufficient purge area to vent the flow of leaked contaminated air and used hot bearing cooling air into the purge annulus 256. The first set of seals 258 may have a smaller diameter as compared with a second set of seals 260. A radial interface 252 with surface-to-surface contact between the seal assembly 240 and the bearing housing 250 may prevent leakage of contaminated air from the purge annulus 256 into the plurality of journal bearings 222.

The second set of seals 260 may be disposed adjacent to the compressor wheel 142, and may have a flange 268 to effect installation of the seal assembly 240 into the seal and bearing housing 250 while assuring contact between the seal assembly 240 and a bearing housing recess 280 disposed on the seal and bearing housing 250. A seal retainer 294 may trap the seal assembly 240 into the bearing housing 250 via a bearing housing recess 290 to accommodate the seal retainer 294. Dashed arrows (compressor flow leakage 188) indicate the flow direction of leaked contaminated air from behind the compressor wheel 142 through about 0.003 to about 0.004 inch clearance between the seal assembly 240 and the mating components of rotating assembly 200.

Figure 4:
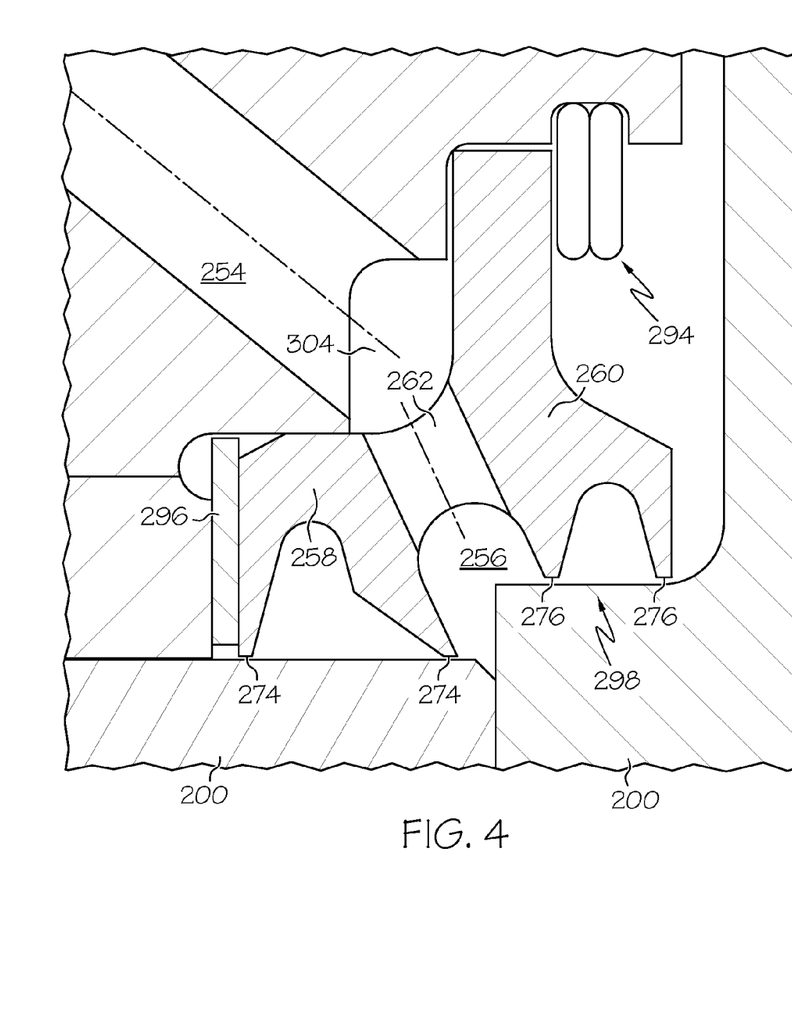
FIG. 4 is another cross sectional partial view of an air cycle machine including a contaminant-deflector labyrinth seal assembly according to an exemplary embodiment of the present invention.

FIG. 4 is a further cross sectional partial view of an air cycle machine including a detailed view of a contaminant-deflector labyrinth seal assembly according to an exemplary embodiment of the present invention. FIG. 4 depicts the housing vent hole 254, the housing annular channel 304, a seal spacer 296, at least one seal assembly vent hole 262, a first clearance 274 between the plurality of seals having smaller diameter 258 and the mating components of rotating assembly 200, a stepped mating component of the seal assembly 298, and a second clearance 276 between the plurality of seals having larger diameter 260 and the mating components of rotating assembly 200.

Seal may be provided behind the compressor wheel to reduce the leakage 188 (see FIG. 3) of pressurized air that is needed to drive the turbine wheel and therefore affect the performance of the air cycle machine. On the other hand, seal is provided downstream of the bearing cooling air flow 222 (see FIG. 3) to control its flow (excessive bearing cooling air flow may reduce available air to drive the turbine and insufficient bearing cooling flow may result in bearing overheat and unit failure). To prevent excessive rub against its rotating mating components and cause shaft instability and unit failure, the seals may be designed with a larger diameter than the mating components thereby creating clearances 274 and 276 between the seals 258, 260 without losing excessive amount of pressurized air and sacrifice unit performance.

Figure 5:
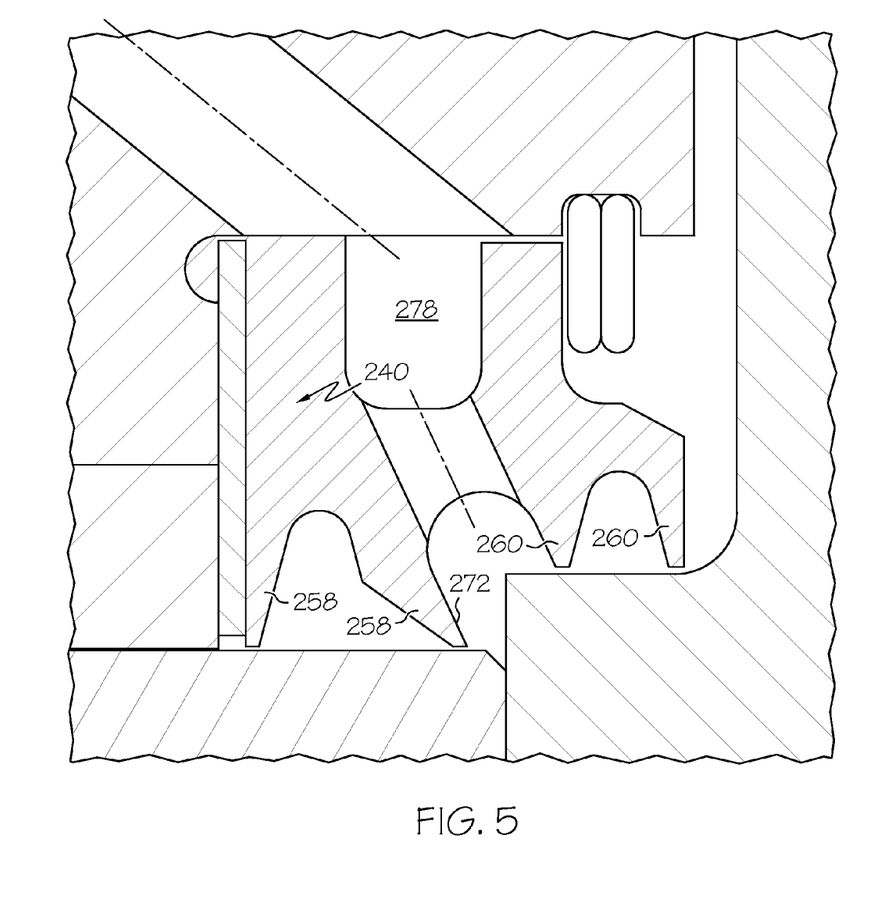
FIG. 5 is a further cross sectional partial view of an air cycle machine including a contaminant-deflector labyrinth seal assembly according to an exemplary embodiment of the present invention.

Referring now to FIG. 5, there is shown a detailed view cross-sectional view of a contaminant-deflector labyrinth seal assembly according to another exemplary embodiment of the present invention. FIG. 5 shows the seal assembly 240, the plurality of small diameter seals 258, an optional groove 278 inscribed on the outside surface of the seal assembly 240 to trap contaminants centrifuged into the groove, the deflector face 272 of the plurality of small diameter seals 258 and the plurality of large diameter seals 260. When the optional groove 278 is inscribed on the outside surface of the seal assembly 240, the housing annular channel 304 may not be required.

Figure 6:
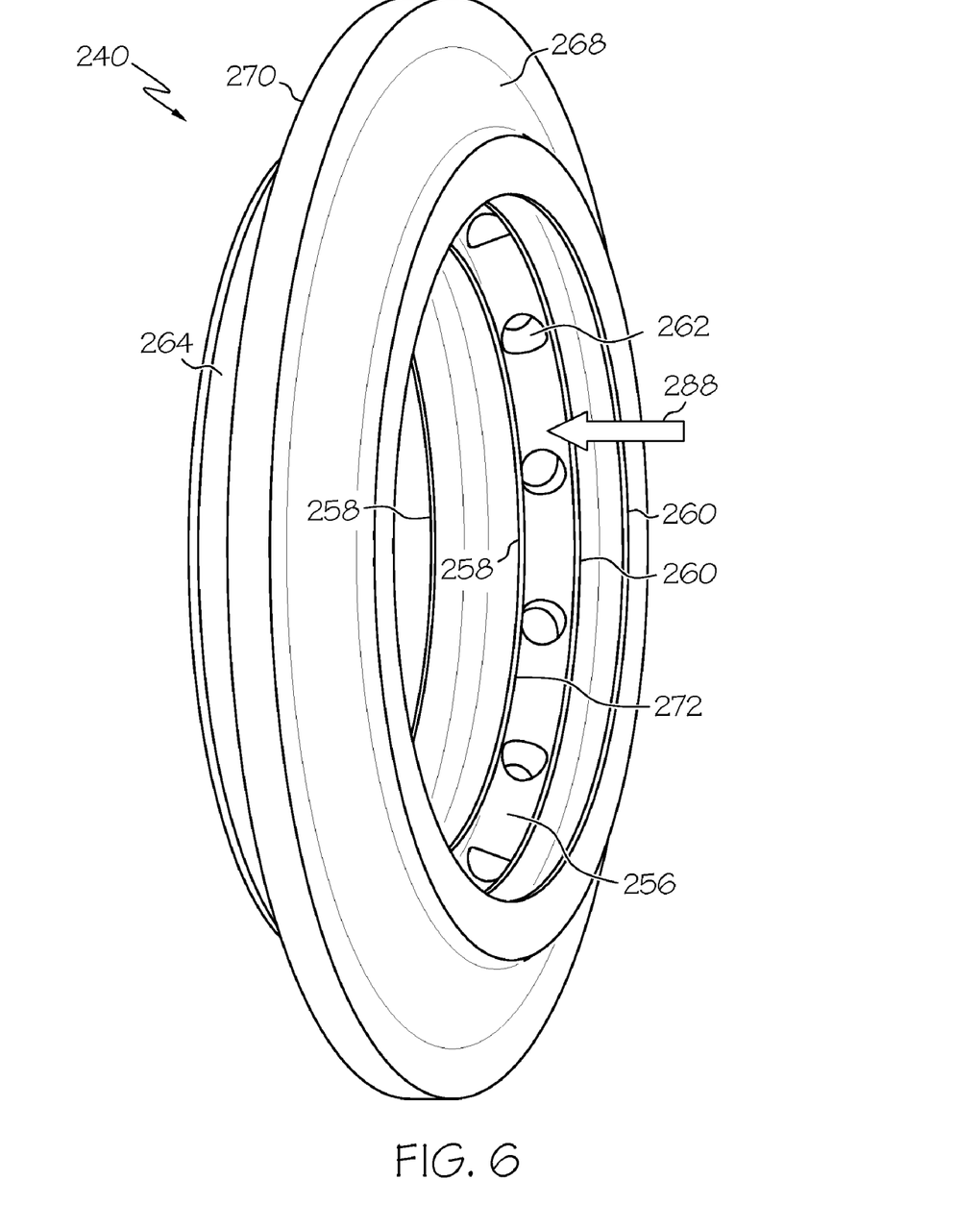
FIG. 6 is a detailed isometric view of a contaminant-deflector labyrinth seal assembly according to a further exemplary embodiment of the present invention; and, FIG. 7 is a flow chart showing a method of operating a contaminant-deflector labyrinth seal according to an exemplary embodiment of the present invention.

FIG. 6 is a detailed isometric view of a contaminant-deflector labyrinth seal assembly 240 according to a further exemplary embodiment of the present invention. FIG. 6 shows the seal assembly 240, including the seal flange 268 to facilitate seal installation into the bearing housing, a plurality of seal assembly vent holes 262 peripherally disposed on the purge annulus 256, the first set of seals 258, the deflector face 272, the second set of seals 260, a circumferential surface 264 that forms the lower part of the seal vent hole purge and pilots against the mating housing bore, and the opposite side of the seal flange 270 that bounds the housing annular channel to form part of the seal vent hole purge area around the first set of seals having smaller diameter. FIG. 6 also shows the flow direction of contaminated air 288 vented through the seal assembly 240.

Figure 7:
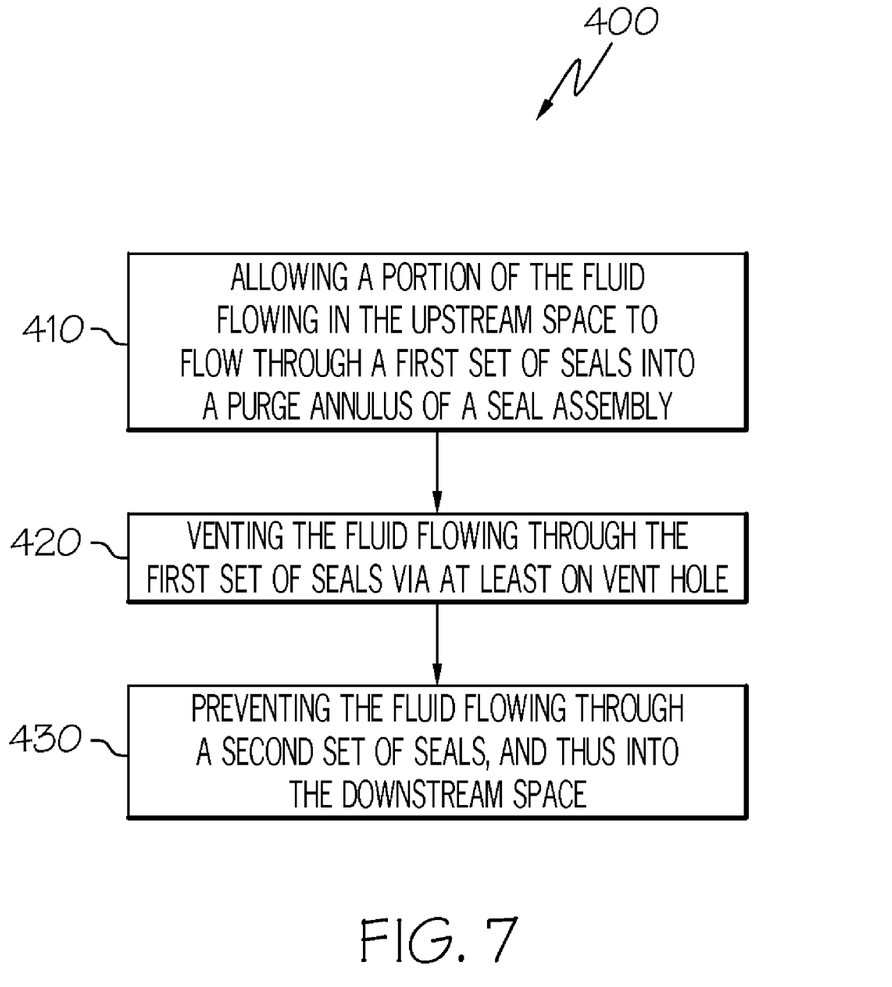

FIG. 7 is a flow chart showing a method 400 of operating a contaminant-deflector labyrinth seal according to an exemplary embodiment of the present invention. A method of preventing contamination between an upstream space and a downstream space containing fluids at different pressures comprises a step 410 allowing a portion of the fluid flowing in the upstream space to flow through a first set of seals into a purge annulus of a seal assembly; a step 420 of venting the fluid flowing through the first set of seals via at least one vent hole; and a step 430 of preventing the fluid flowing through a second set of seals, and thus into the downstream space.

Alternative exemplary embodiments of the invention include at least one seal assembly vent hole 262 in the form of a radial hole, axial slot or the like. An optional groove 278 inscribed on the surface of the seal assembly 240 between the seal assembly 240 and seal and bearing housing 250 collects the contaminated fluid that passed through the at least one seal assembly vent hole 262 and before the contaminated fluid has passed through the at least one bearing housing vent hole 254.

The first set of seals 258 may be a labyrinth seal and the second set of seals 260 may comprise at least one selected from the group consisting of brush type seal, piston ring seal, carbon face seal, and combination thereof.

The first set of seals 258 may be formed from a plurality of labyrinth seals to reduce the effect of venting contaminated fluid on turbine performance.

As another exemplary embodiment of the present invention, the first set of seals 258, the second set of seals 260, or both, may be formed from one piece. The first set of seals 258, the second set of seals 260, or both, may be formed from polyimide. The first set of seals 258 may be formed from material softer than the shaft 20 journal. The second set of seals 260 may be formed from a material softer than the compressor wheel 142.

It should be understood, of course, that the foregoing relates to exemplary embodiments of the invention and that modifications may be made without departing from the spirit and scope of the invention as set forth in the following claims.

We claim:

1. A sealing apparatus for routing a contaminated fluid flowing from an upstream space to a downstream space, the sealing apparatus comprising:
   an annular housing;
   at least one housing vent hole peripherally disposed in the annular housing; and
   a labyrinth seal device positioned in the annular housing, the labyrinth seal device having first and second sets of seals and having a purge annulus disposed between the first and second sets of seals,
   the first set of seals having an inclined deflector face,
   the purge annulus having a plurality of seal-device vent holes peripherally disposed on the purge annulus,
   the seal-device vent holes having axes parallel to the inclined deflector face and being in fluid communication with the housing vent hole,
   the first set of seals being disposed within the annular housing adjacent to the downstream space, the first set of seals having an inclined surface to deflect the flow of contaminated fluid through the at least one housing vent hole, and
   the second set of seals being disposed within the annular housing adjacent to the upstream space.

2. The sealing apparatus of claim 1, wherein the second set of seals has larger inside diameter than the first set of seals to offset flow of the contaminated fluid and to vent the contaminated fluid through the at least one vent hole.

3. The sealing apparatus of claim 2, wherein the housing vent holes are axial slots in the annular housing.

4. The sealing apparatus of claim 2, wherein the housing vent holes are radial holes in the annular housing.

5. The sealing apparatus of claim 2, including a groove peripherally disposed within the annular housing to collect the expelled contaminated fluid that passed through the at least one housing vent hole.

6. The sealing apparatus of claim 2, wherein the contaminated fluid is contaminated air.

7. The sealing apparatus claim 2, wherein the contaminated fluid is at least one of contaminated liquid oxygen, contaminated liquid hydrogen, and contaminated water.

8. The sealing apparatus of claim 2, installed in an air cycle machine.

9. A sealing apparatus for routing a contaminated fluid flowing from an upstream space to a downstream space in a bearing housing, comprising:
 an annular housing;
 at least one housing vent hole peripherally disposed in the annular housing;
 an integral labyrinth seal device having first and second sets of seals, having a purge annulus disposed between the first and second sets of seals, having a plurality of seal-device vent holes peripherally disposed on the purge annulus, and having a contaminant-trap groove in fluid communication with the purge annulus, the purge annulus and the contaminant-trap groove being in fluid communication with the housing vent hole,
 the first set of seals being disposed within the annular housing adjacent to the downstream space and having an inclined surface with respect to the direction of flow where the flow is directed at mid-span of the inclined surface to deflect the contaminated fluid through the at least one housing vent hole, and
 the second set of seals being disposed within the annular housing adjacent to the upstream space;
 a first bearing housing recess, recessed to accommodate a seal flange;
 a seal retainer disposed adjacent to the seal device; and
 a second bearing housing recess, recessed to accommodate the seal retainer.

10. The sealing apparatus of claim 9, wherein the second set of seals has larger inside diameter than the first set of seals to offset the flow of the contaminated fluid and to vent the contaminated fluid through the at least one housing vent hole.

11. A method of preventing contamination between an upstream space and a downstream space containing fluids at different pressures, the method comprising:
 allowing a portion of the fluid flowing in the upstream space to flow through a first set of seals into a purge annulus of a seal device;
 venting the fluid flowing through the first set of seals via at least one vent hole through the seal device;
 trapping contaminants in a groove inscribed on an outside surface of the seal device; and
 preventing the fluid from flowing through a second set of seals of the seal device, and thus preventing the fluid from flowing into the upstream space of the second set of seals and into the downstream space of the first set of seals, wherein the upstream space of the first set of seals is pressurized with a compressor outlet flow of an air cycle machine and the upstream space of the second set of seals is pressurized with a journal bearing cooling flow of the air cycle machine.

12. The method of claim 11, wherein the fluid flowing in the upstream space and the fluid flowing in the downstream space are both air.

13. The method of claim 11, wherein the contamination flow into the downstream space is prevented during start of the air cycle machine, when internal cavities of the air cycle machine are not fully pressurized.

* * * * *